(12) United States Patent
El-Gammal et al.

(10) Patent No.: US 10,954,840 B2
(45) Date of Patent: Mar. 23, 2021

(54) DEF INJECTION STRATEGY FOR MULTIPLE INJECTION SYSTEMS

(71) Applicant: Robert Bosch GmbH, Stuttgart (DE)

(72) Inventors: Mohamed El-Gammal, Windsor (CA); Mark V. Casarella, Ypsilanti, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/635,747

(22) PCT Filed: Aug. 1, 2018

(86) PCT No.: PCT/IB2018/001035
§ 371 (c)(1),
(2) Date: Jan. 31, 2020

(87) PCT Pub. No.: WO2019/025870
PCT Pub. Date: Feb. 7, 2019

(65) Prior Publication Data
US 2020/0347764 A1 Nov. 5, 2020

Related U.S. Application Data

(60) Provisional application No. 62/540,212, filed on Aug. 2, 2017.

(51) Int. Cl.
*F01N 3/20* (2006.01)
*B01D 53/94* (2006.01)
(Continued)

(52) U.S. Cl.
CPC ......... *F01N 3/208* (2013.01); *B01D 53/9431* (2013.01); *B01F 5/04* (2013.01);
(Continued)

(58) Field of Classification Search
CPC ..... B01D 53/9431; B01F 5/04; F01N 3/0842; F01N 3/208; F01N 3/2066; F01N 3/2892;
(Continued)

(56) References Cited

U.S. PATENT DOCUMENTS

| 5,976,475 A | 11/1999 | Peter-Hoblyn et al. |
| 7,028,680 B2 | 4/2006 | Liu et al. |

(Continued)

FOREIGN PATENT DOCUMENTS

| CN | 106030063 A | 10/2016 |
| DE | 102011077156 B4 | 12/2012 |

(Continued)

OTHER PUBLICATIONS

Adelman et al., "Direct Injection into the Exhaust Stream of Gaseous Ammonia: Design and Efficiency of Injection and Mixing Hardware," SAE Technical Paper, 2015, 2015-01-1021.
(Continued)

*Primary Examiner* — Audrey K Bradley
*Assistant Examiner* — Dapinder Singh
(74) *Attorney, Agent, or Firm* — Michael Best & Friedrich LLP (57) ABSTRACT

A diesel exhaust system includes multiple injectors for providing diesel exhaust fluid to an exhaust to reduce $NO_x$ emissions. Two or more injectors provide DEF to the exhaust system of an engine. In one mode, the injectors alternately inject DEF fluid. In one embodiment, the system includes a $NO_x$ sensor or a $NO_x$ model to assist in determining an amount of DEF that must be provided. In a high DEF output operating mode, the DEF amount for one injector is output at a higher rate than the other injector such that deposits may form. After the injector at the higher rate of injection operates for a selected fraction of time, the other injector provides DEF fluid at the higher rate. Further, the system calculates an estimated developed liquid film mass for each injector output. When the estimated developed liquid film mass is not less than a parameter limit film mass, the system performs ATS regeneration.

20 Claims, 8 Drawing Sheets

(51) Int. Cl.
*B01F 5/04* (2006.01)
*F01N 3/08* (2006.01)
*F01N 3/28* (2006.01)

(52) U.S. Cl.
CPC ......... *F01N 3/0842* (2013.01); *F01N 3/2892* (2013.01); *F01N 2610/146* (2013.01); *F01N 2900/08* (2013.01); *F01N 2900/1402* (2013.01); *F01N 2900/1821* (2013.01)

(58) Field of Classification Search
CPC .. F01N 9/00; F01N 2560/026; F01N 2610/02; F01N 2610/146; F01N 2900/08; F01N 2900/1402; F01N 2900/1812; F01N 2900/1821; Y02T 10/12; Y02T 10/40
USPC .................. 60/274, 277, 286, 295, 299–301
See application file for complete search history.

(56) References Cited

U.S. PATENT DOCUMENTS

| | | | |
|---|---|---|---|
| 7,032,578 | B2 | 4/2006 | Liu et al. |
| 7,140,357 | B2 | 11/2006 | Wei et al. |
| 7,552,722 | B1 | 6/2009 | Shieh et al. |
| 7,814,745 | B2 | 10/2010 | Levin et al. |
| 8,006,480 | B2 | 8/2011 | McCarthy, Jr. et al. |
| 8,109,077 | B2 | 2/2012 | Reba et al. |
| 8,418,443 | B2 | 4/2013 | Millet et al. |
| 8,491,842 | B2 | 7/2013 | Johansen et al. |
| 8,881,712 | B2 | 11/2014 | De Almeida et al. |
| 8,935,918 | B2 | 1/2015 | Vosz |
| 9,192,892 | B2 | 11/2015 | Nunez et al. |
| 9,334,778 | B2 | 5/2016 | Henry et al. |
| 9,375,682 | B2 | 6/2016 | Maus et al. |
| 2009/0173063 | A1 | 7/2009 | Boorse et al. |
| 2013/0031891 | A1 | 2/2013 | Ponnathpur |
| 2013/0115150 | A1* | 5/2013 | Fritsch ................ F01N 13/0093 423/212 |
| 2014/0166141 | A1 | 6/2014 | Golin et al. |
| 2014/0318112 | A1 | 10/2014 | Solbrig et al. |
| 2014/0360168 | A1 | 12/2014 | Broderick et al. |
| 2015/0013309 | A1 | 1/2015 | Upadhyay et al. |
| 2015/0059317 | A1 | 3/2015 | Mital et al. |
| 2015/0240689 | A1 | 8/2015 | Guilbaud et al. |
| 2015/0285192 | A1 | 10/2015 | Roth et al. |
| 2015/0345356 | A1 | 12/2015 | Yi et al. |
| 2016/0090887 | A1 | 3/2016 | Mitchell et al. |
| 2016/0158714 | A1 | 6/2016 | Li et al. |
| 2016/0160725 | A1 | 6/2016 | Hudgens et al. |
| 2016/0356200 | A1 | 12/2016 | Bressler et al. |
| 2017/0051654 | A1 | 2/2017 | Gupta et al. |
| 2017/0130628 | A1* | 5/2017 | Franz ..................... F01N 3/2882 |
| 2017/0218828 | A1* | 8/2017 | Schweizer .............. F01N 3/208 |

FOREIGN PATENT DOCUMENTS

| | | |
|---|---|---|
| DE | 102013223313 A1 | 5/2015 |
| EP | 2955351 A1 | 12/2015 |
| JP | 2015110929 A | 6/2015 |
| WO | 2014051605 A1 | 4/2014 |
| WO | 2014051617 A1 | 4/2014 |
| WO | 2015071233 A1 | 5/2015 |
| WO | 2018001789 A1 | 6/2017 |

OTHER PUBLICATIONS

Bari et al., "Optimized Number of Intake Runner Guide Vanes to Improve In-Cylinder Airflow Characteristics of CI Engine Fuelled by Higher Viscous Fuels," SAE 2014 World Congress & Exhibition, 2014, 2014-01-0661.

Bora et al., "Investigation on the flow behavior of a venturi type gas mixer designed for dual fuel diesel engines," Int. J. of Emerging Tech. and Adv. Eng., 2013, 3(3):202-209.

Bosch, "Invention Report No: 2016/0398," published May 2016 (4 pages).

Smith et al., "Evaluation and Prediction of Deposit Severity in SCR Systems," SAE International J. Engines, 2016, 9 (3):1735-1750.

International Search Report and Written Opinion for Application No. PCT/IB2018/001035 dated Dec. 7, 2018 (13 pages).

* cited by examiner

DEF INJECTION STRATEGY FOR MULTIPLE INJECTION SYSTEMS

RELATED APPLICATIONS

This application claims priority from U.S. Provisional application 62/540,212, filed Aug. 2, 2017, the disclosure of which is hereby incorporated by reference in its entirety.

BACKGROUND

The present arrangement relates to a diesel exhaust fluid (DEF) injection strategy for multiple injections systems for a vehicle.

SUMMARY

Selective catalytic converter (SCR) is widely used as an effective method in reducing diesel $NO_x$ emissions. In order to meet future low nitrogen oxide(s) ($NO_x$) emission requirements such as super ultra-low emissions vehicle (SULEV) 30 for passenger vehicles & CARB low 0.02 NOx for heavy duty and off-highway applications, high DEF fluid injection rates will be required. High urea dosing rates will increase the level of DEF fluid liquid film wall thicknesses in SCR mixing sections, which in consequence might lead to increasing the risk of solid deposit byproduct formation. The risk of solid deposits formation is even higher during engine cold starts and/or low load operating conditions. Solid deposits in SCR systems significantly hamper the SCR mixer functionality. They may also increase the SCR exhaust back pressure, DEF fluid consumption and reduce the ammonia distribution at SCR inlet.

The current arrangement considers the development of DEF fluid injection strategies for dual or multi DEF injection systems. The considered injection strategies are as follows:

a. The standard mode which considers directly splitting the amount of DEF required for reducing $NO_x$ between two or more injectors. In order to significantly reduce risk of deposit formation, the injected DEF amount per injector is less than or equal to the dosing limit of the injection mixing section.

b. The alternating mode where one injector injects higher DEF dosing rates compared to the other injector or injectors till reaching dosing limit threshold, then dosing rate increases at another DEF injector in an alternating fashion. A special case of this mode considers only injecting DEF via only one injector till reaching dosing limit threshold while others are idle.

High dosing rates in SCR system might be required to meet future low NO emission requirements such as low emission vehicle (LEV) III $NO_x$ emission requirements. At low temperature operating points, i.e., exhaust temperatures between 180~250° C., due to the lack of DEF liquid film evaporation rates there is a high chance that biuret and other undesirable solid byproducts can be formed. These byproducts can be formed along the SCR mixer flaps, mixer walls and/or along the SCR catalyst upstream cone. The SCR solid deposit buildup can adversely increase exhaust back pressure, reduce the delivered ammonia amount or uniformity at SCR catalyst inlet, thus hampers the SCR system functionality.

In one embodiment, a method for controlling multiple injectors for injecting diesel exhaust fluid into a diesel exhaust system comprises: determining an amount of diesel exhaust fluid to reduce NOx emissions at an engine operating point and determining when there is a risk of deposit formation. When there is a risk of deposit formation, the method operates one of the injectors at a first injection rate and operates another one of the injectors at a second injection rate, each for a selected fraction of time. The method includes estimating a developed liquid film mass for each of the injectors, comparing the estimated developed liquid film mass for each of the injectors with a parameter limit film mass for each of the injectors, and when one of the estimated developed liquid film mass is not less than the corresponding parameter limit film mass, performing an ATS regeneration of the SCR to remove a deposit will take place. In another embodiment, both of the estimated developed liquid film masses must be greater than the respective corresponding parameter limit film masses to perform an ATS regeneration of the SCR.

Another embodiment is directed to a diesel exhaust system for controlling multiple injectors for injecting diesel exhaust fluid into a diesel exhaust system. The diesel exhaust system includes multiple injectors, a dosing controller for controlling the multiple injectors, and a processor. The processor is configured to: determine an amount of diesel exhaust fluid to reduce NOx emissions at an engine operating point and determine when there is a risk of deposit formation. When there is a risk of deposit formation, the processor is configured to, with the dosing controller, operate one of the injectors at a first injection rate and operate another one of the injectors at a second injection rate, each for a selected fraction of time. The processor is configured to estimate a developed liquid film mass for each of the injectors, and compare the estimated developed liquid film mass with a parameter limit film mass for each of the injectors.

Other aspects of the embodiments will become apparent by consideration of the detailed description and accompanying drawings.

DETAILED DESCRIPTION

Before any embodiments are explained in detail, it is to be understood that the embodiments are not limited in its application to the details of construction and the arrangement of components set forth in the following description or illustrated in the following drawings. Other embodiments are capable of being practiced or of being carried out in various ways.

The current arrangement considers the development of a dosing strategy for dual or multi DEF injection system installed in a serial fashion. The utilization of either two or multiple injectors for delivering the DEF fluid to the diesel exhaust flow will have a significant impact on reducing the risk of solid deposit formation.

Two dosing strategy modes are developed as follows.

a. The standard mode which considers directly splitting the amount of DEF required for reducing $NO_x$ between two or more injectors. In order to significantly reduce risk of deposit formation, the injected DEF amount per injector is less or equal to dosing limit of the injection mixing section (see Figures for definitions)

b. The alternating mode where one injector injects higher DEF dosing rates compared to others till reaching dosing limit threshold, then dosing rate increases at another DEF injector in an alternating fashion. The injected amount is greater than 100% of the rated or generally desired amount for constant injection by the DEF injector. A special case of this mode considers only injecting DEF via only one injector till reaching dosing limit threshold while others are idle. This injection mode is considered only when the DEF amount required for $NO_x$ conversion exceeds the dosing limit of the SCR mixing section. Thus, the injected amount is greater than 100% of the rated or generally desired amount for injection by the mixing section.

Figure 1:
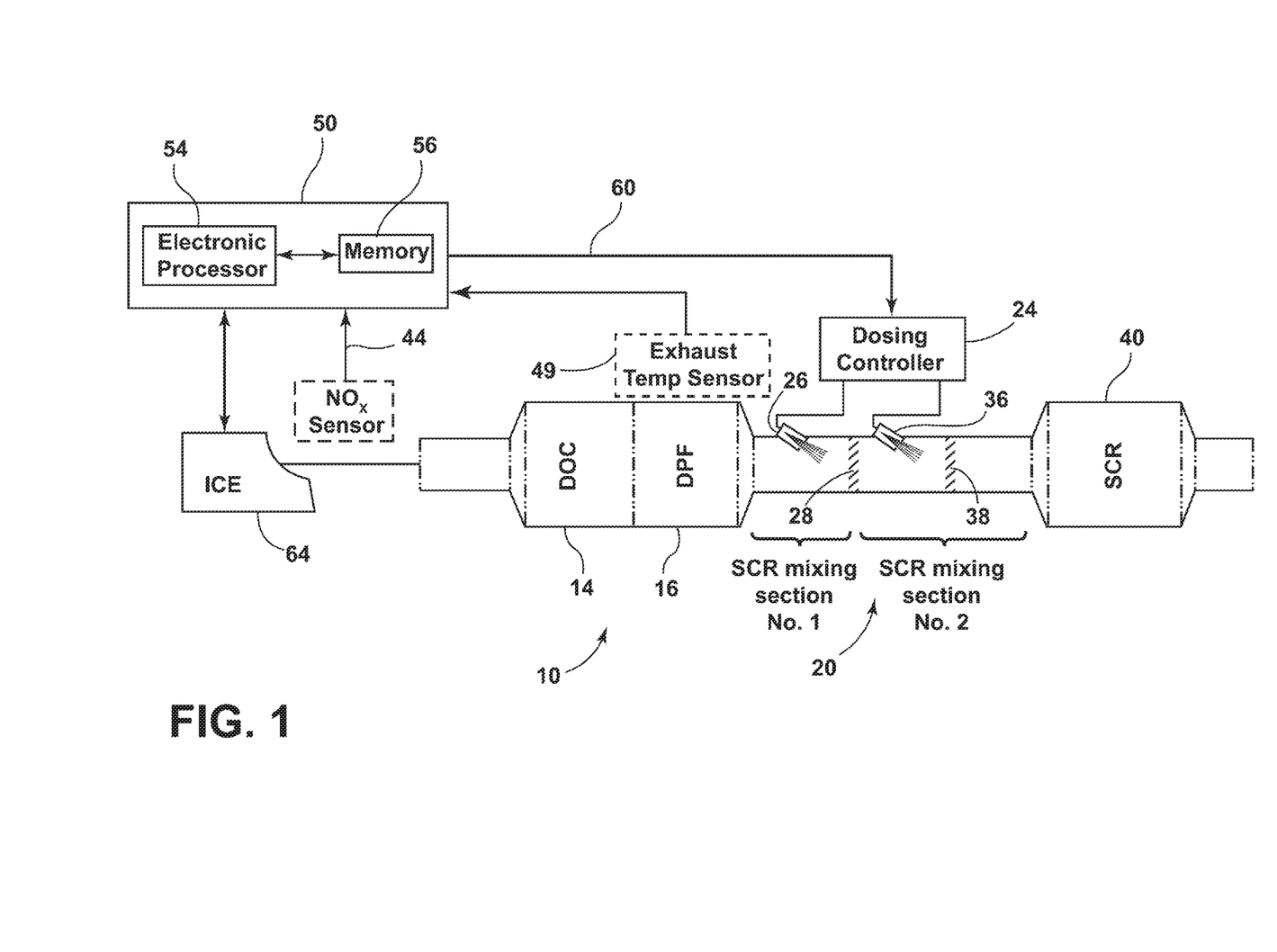
FIG. 1 is a diagram of a diesel exhaust system with two DEF injection systems in conjunction with two impingement mixers.

FIG. 1 shows a diesel exhaust system 10 that includes a diesel oxidation catalyst (DOC) 14 in series with a diesel particulate filter (DPF) 16 and a SCR mixing section 20 that includes a dosing controller 24, a first injector 26 and a first impingement plate 28. The SCR mixing section 20 includes a second injector 36, and a second impingement plate 38. The diesel exhaust system 10 includes a selective catalytic converter (SCR) 40. In one embodiment, a $NO_x$ sensor is not provided and an $NO_x$ model determines and obtains $NO_x$ value for the exhaust stream. In another embodiment, a $NO_x$ sensor 44 is provided to provide an output to an electronic control unit (ECU) 50. In one embodiment, an exhaust temperature model determines exhaust temperature for the exhaust stream. In another embodiment, an exhaust temperature sensor 49 provides an exhaust temperature output to the ECU 50. The ECU 50 includes an electronic processor 54 having a memory 56. The memory 56 may include non-transitory computer readable memory, such as volatile memory, non-volatile memory, or a combination thereof and, in various constructions, may also store operating system software, applications/instructions data, and combinations thereof. The memory 56 may be read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. The electronic processor 54 (e.g., a microprocessor, application specific integrated circuit, etc.), is coupled to the memory 56.

In one embodiment, the dosing controller 24 is incorporated into the ECU 50. In another embodiment, the ECU 50 is separate from and in communication over a communication bus 60 with the dosing controller 24. The dosing controller 24 includes an electronic processor and memory in another embodiment. The dosing controller 24 controls valves of the injectors 26, 36 to inject DEF provided by a DEF storage tank. The communication bus 60 is a CAN bus, a FLEX RAY bus, or other type of communication bus. Further, FIG. 1 shows an internal combustion engine 64 that provides exhaust for the diesel exhaust system 10.

Figure 2:
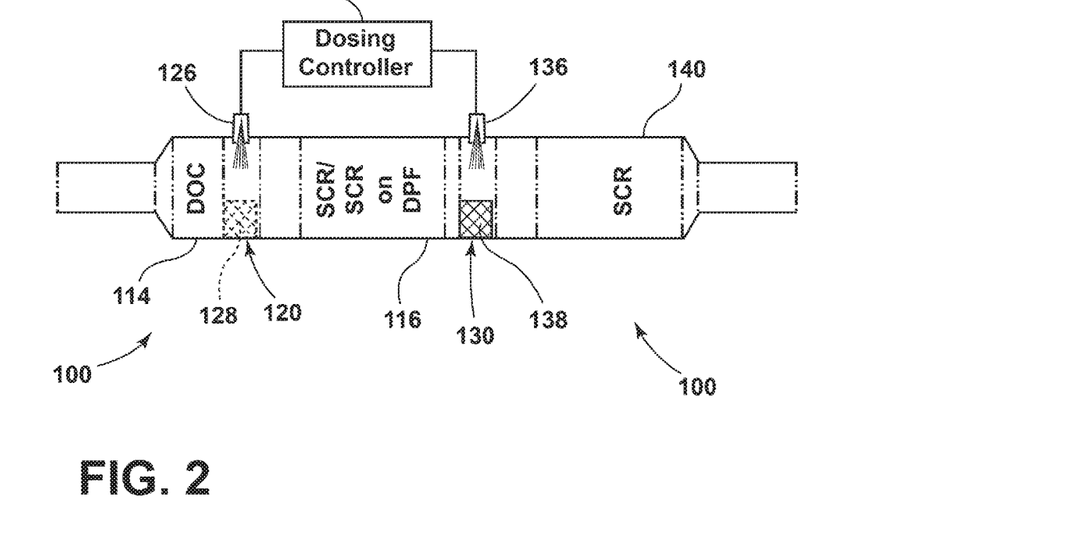
FIG. 2 is a diagram of a diesel exhaust system with two spaced compact DEF injection systems.

FIG. 2 shows an embodiment of a diesel exhaust system 100 that includes a diesel oxidation catalyst (DOC) 114 in series with a selective catalytic converter (SCR) 116 and a first compact mixing section 120 there between. The first compact mixing section 120 defines a compact SCR mixer that includes a first injector 126 and a first impingement plate 128. In another embodiment, the first impingement plate 128 shown in broken line is removed and a portion of the exhaust pipe acts as an evaporation section. In one embodiment, the algorithm controlling the diesel exhaust system 100 is independent of the presence of the first impingement plate 128. A second compact mixing section 130 defines a compact SCR mixer that includes a second injector 136, and a second impingement plate 138. The first injector 126 and the second injector 136 are controlled by a dosing controller 124. The second compact mixing section 130 is disposed between the SCR 116 and a selective catalytic converter (SCR) 140. In one embodiment, the SCR 116 includes a DPF in addition to the SCR. The diesel exhaust system 100 is provided with an internal combustion engine having an electronic control unit.

Figure 3:
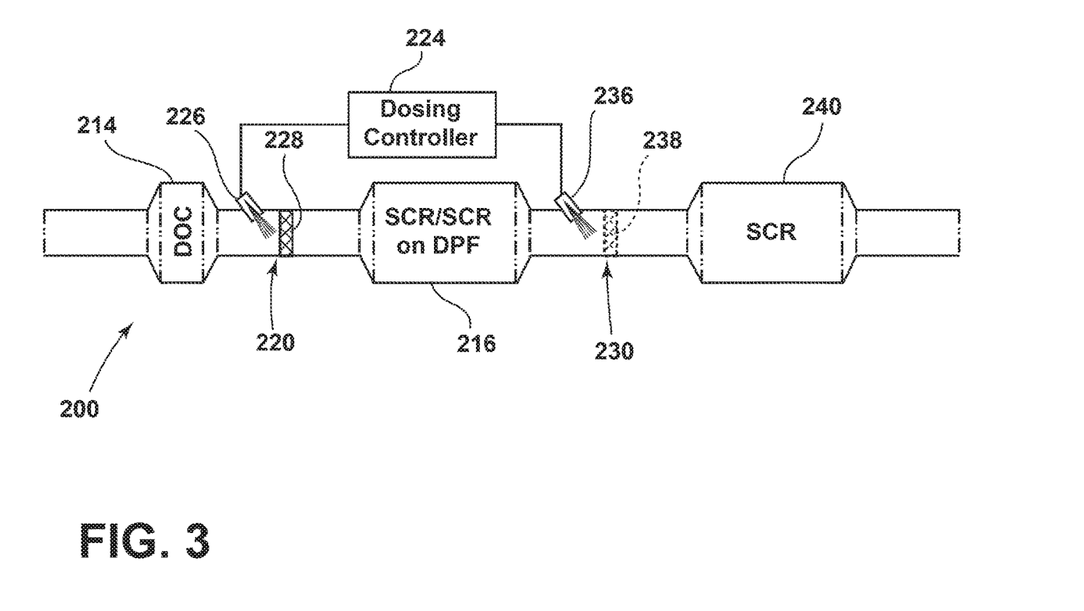
FIG. 3 is a diagram of a diesel exhaust system with two DEF injectors in conjunction with two impingement mixers spaced from each other.

FIG. 3 shows an embodiment of a diesel exhaust system 200 that includes a diesel oxidation catalyst (DOC) 214 in series with a selective catalytic converter (SCR) 216 and a first mixing section 220 there between. The first mixing section 220 includes a first injector 226 and a first impingement plate 228. A second mixing section 230 includes a second injector 236, and a second impingement plate 238 shown in broken line. In another embodiment, the second impingement plate 228 shown in broken line is removed, and a portion of the exhaust pipe acts as an evaporation source. The first injector 226 and the second injector 236 are controlled by a dosing controller 224. The second mixing section 230 is disposed between the SCR 216 and a selective catalytic converter (SCR) 240. In one embodiment, the SCR 216 includes a DPF that receives the SCR. The diesel exhaust system 200 is provided with an internal combustion engine having an electronic control unit.

Figure 4:
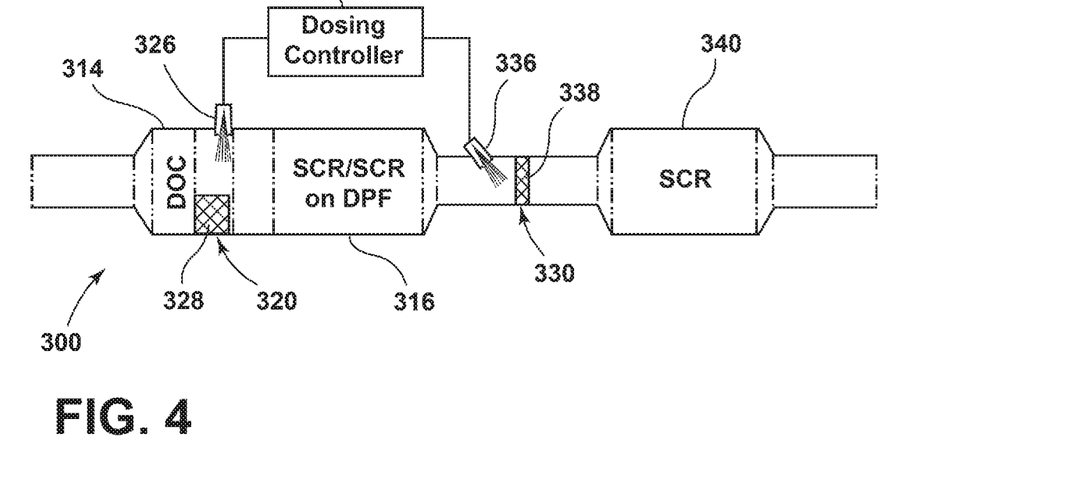
FIG. 4 is a diagram of a diesel exhaust system with a compact DEF injection system spaced from a DEF injector in conjunction with an impingement mixer.

FIG. 4 shows an embodiment of a diesel exhaust system 300 that includes a diesel oxidation catalyst (DOC) 314 in series with a selective catalytic converter (SCR) 316 and a first compact mixing section 320 therebetween. The first compact mixing section 320 includes a first injector 326 and a first impingement plate 328. A second mixing section 330 includes a second injector 336, and a second impingement plate 338. The first injector 326 and the second injector 336 are controlled by a dosing controller 324. In one embodiment, the SCR 316 includes a DPF in addition to the SCR. The diesel exhaust system 300 is provided with an internal combustion engine having an electronic control unit.

Figure 5:
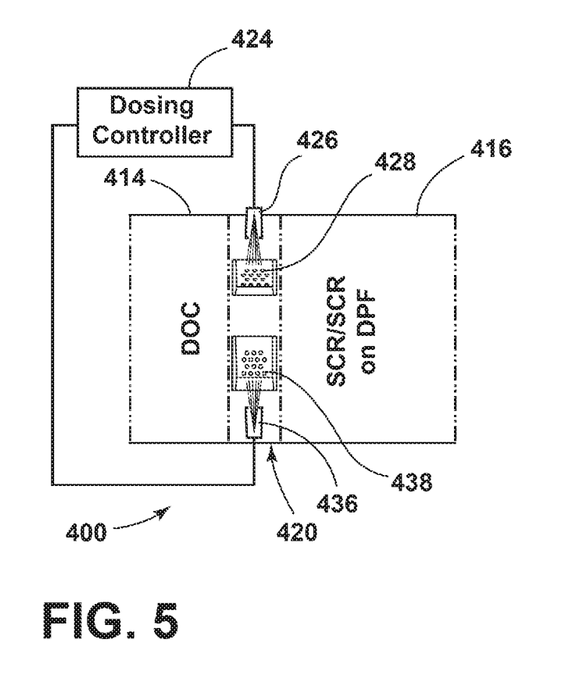
FIG. 5 is a diagram of a diesel exhaust system with a compact DEF injection system having two injectors.
Figure 6:
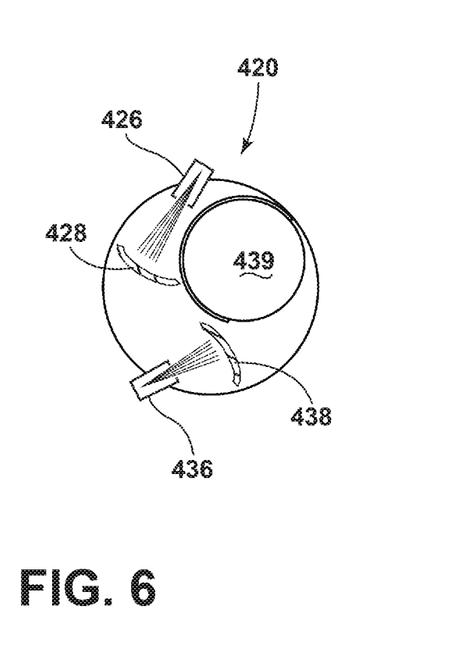
FIG. 6 is a cross sectional view of the compact DEF injection system of FIG. 5.

FIG. 5 shows an embodiment of a diesel exhaust system 400 that includes a diesel oxidation catalyst (DOC) 414 in series with a selective catalytic converter (SCR) 416 and a compact mixing section 420 there between. The compact mixing section 420 includes a first injector 426 and a first impingement plate 428, along with a second injector 436, and a second impingement plate 438. FIG. 6 shows a cross sectional view of the compact mixing section 420 in FIG. 5, including an exit aperture 439 for exhaust flow. The multiple injectors 426, 436 are provided in the single compact mixing section 420 of a compact SCR mixer. The first injector 426 and the second injector 436 are controlled by a dosing controller 424. In one embodiment, the SCR 416 includes a DPF in addition to the SCR. The diesel exhaust system 400 is provided with an internal combustion engine having an electronic control unit.

Figure 7:
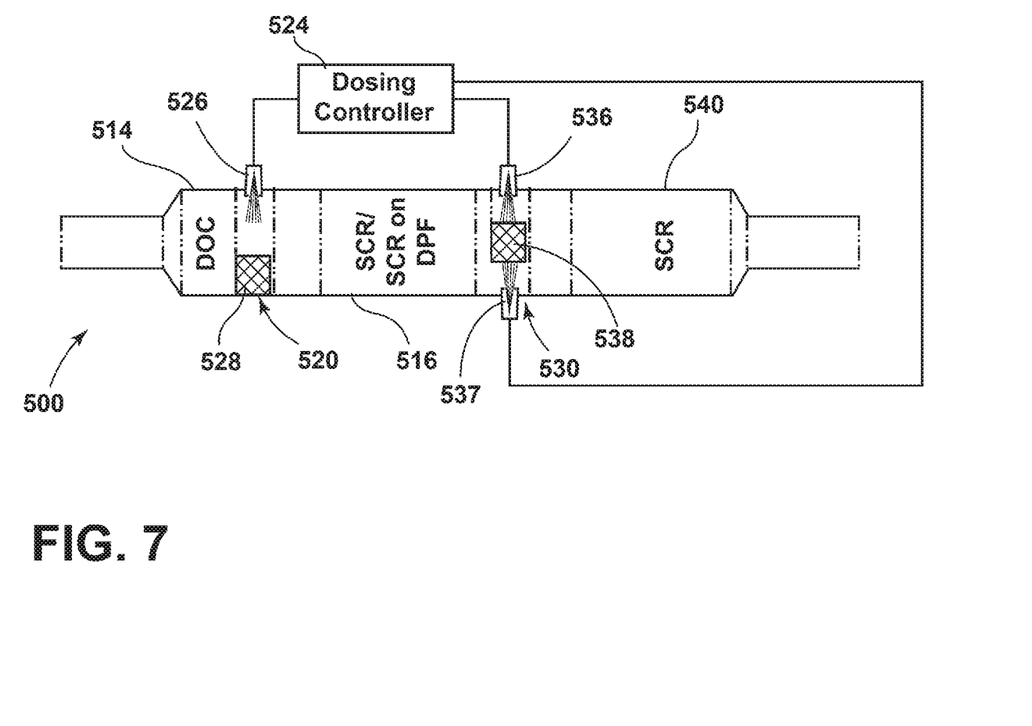
FIG. 7 is a diagram of a diesel exhaust system with a compact DEF injection system having two injectors that is spaced from a compact DEF injection system having one injector.

FIG. 7 shows an embodiment of a diesel exhaust system 500 that includes a diesel oxidation catalyst (DOC) 514 in series with a selective catalytic converter (SCR) 516 and a first compact mixing section 520 there between. The first compact mixing section 520 includes a first injector 526 and a first impingement plate 528. A second mixing section 530 includes a second injector 536, a third injector 537 and at least a second impingement plate 538. In another embodiment, the second impingement plate is not provided and an evaporation section is defined by the interior of the pipe near the injectors 536, 537. The injectors 526, 536, 537 are controlled by a dosing controller 524. Thus, besides a pair of injectors, FIG. 7 shows an additional injector spaced from second mixing section 530 that defines a compact SCR mixer. In one embodiment, the SCR 516 includes a DPF in addition to the SCR. The diesel exhaust system 500 is provided with an internal combustion engine having an electronic control unit. The dosing controller 524 controls the tri-injection system to provide DEF to the exhaust stream.

Operation

Figure 8A:
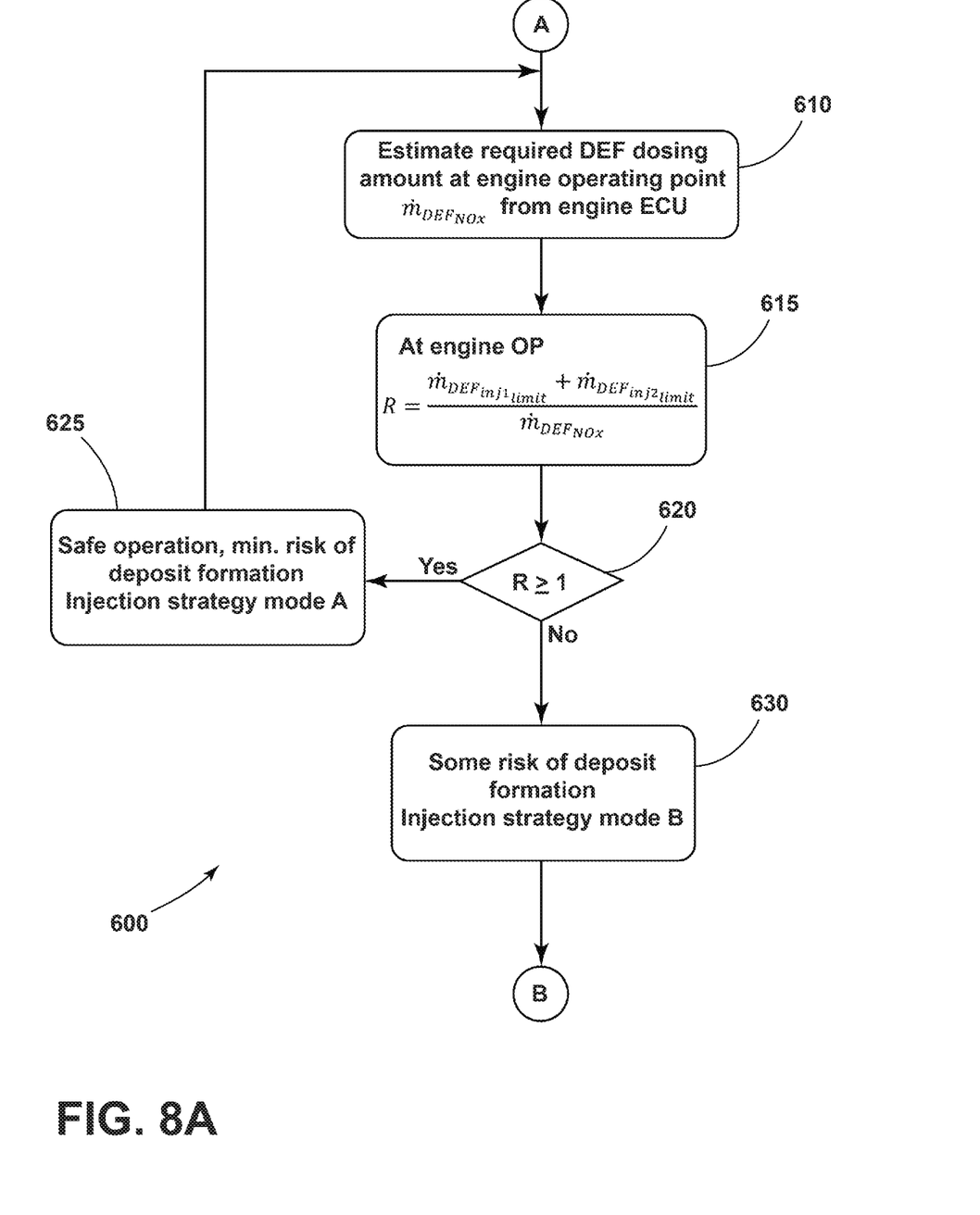
FIG. 8A is a first portion of flowchart of one embodiment of a DEF dosing strategy for an injection system.
Figure 8B:
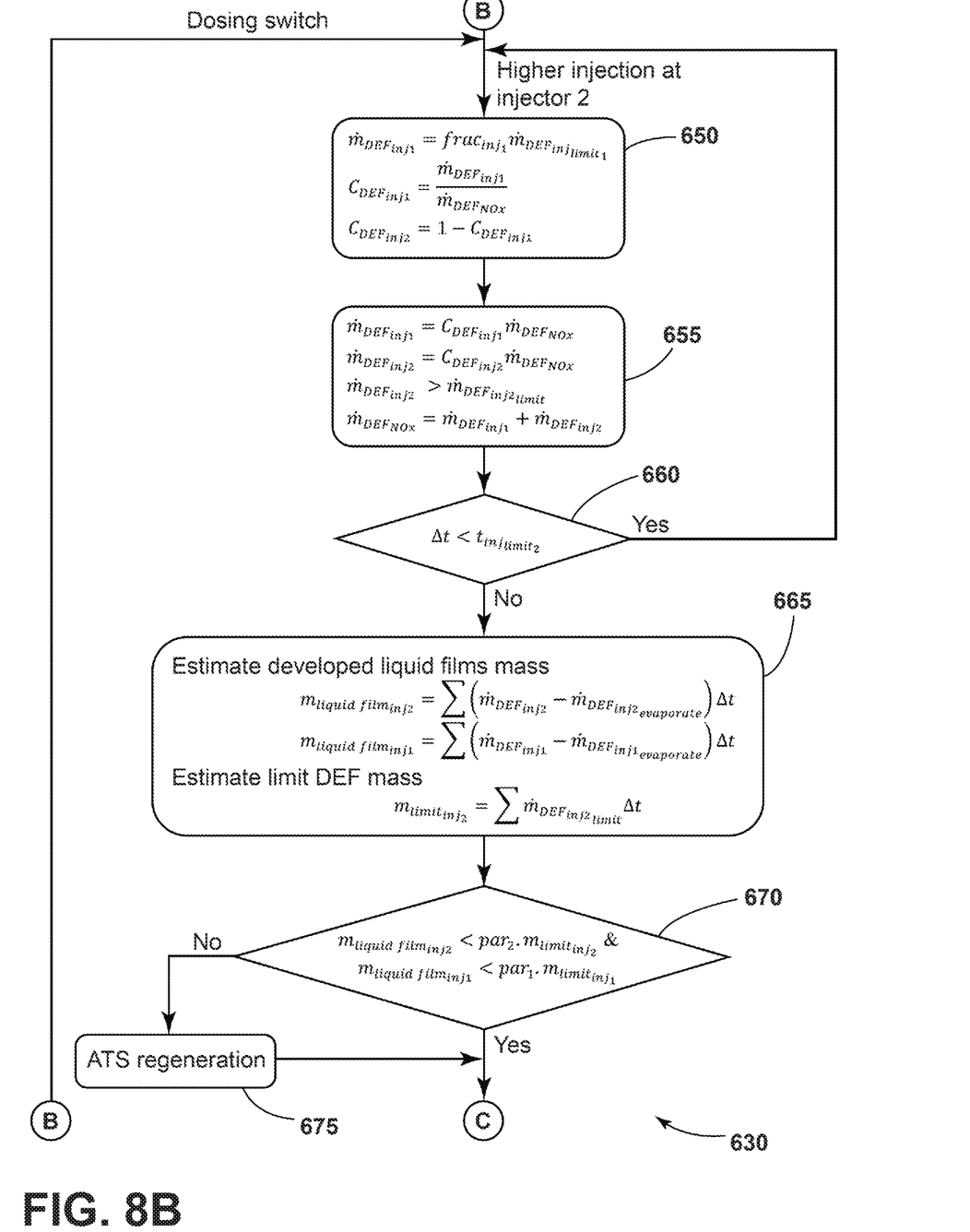
FIG. 8B is a second portion of the flowchart of one embodiment of a DEF dosing strategy for an injection system.
Figure 8C:
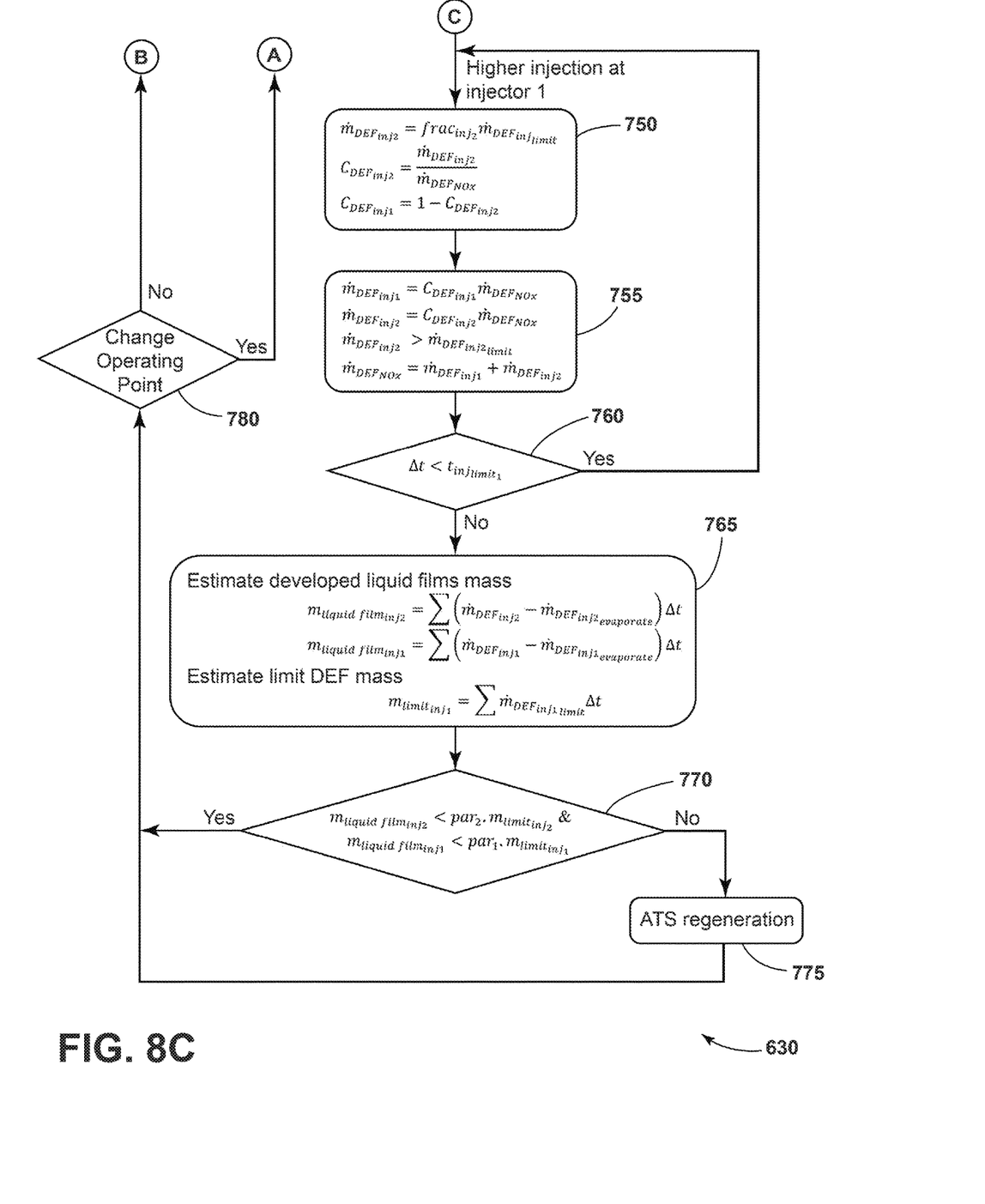
FIG. 8C is a third portion of the flowchart of one embodiment of a DEF dosing strategy for a dual injection system.

FIGS. 8A-8C illustrate a flowchart 600 of a computer program or a set of execution steps for an embodiment of a dosing strategy directed to a method for controlling multiple injectors of an injection system of the embodiments of FIGS. 1-6 having two injectors 26, 36 or for the injection system of FIG. 7 having three injectors 526, 536, 537. For purposes of discussion, FIGS. 8A-8C will be discussed with respect to the embodiment of FIG. 1 as follows. The processing discussed in the flowchart 600 of FIG. 8A is performed by a processor of the ECU 50, a processor of the dosing controller 24 or another controller, not discussed herein that executes steps stored in a memory or other device. In some embodiments, various processors perform different steps. For instance, in one embodiment, the dosing controller 24 may control the injectors 26, 36 in response to outputs from the ECU 50.

FIG. 8A determines a DEF dosing amount from an engine operating point by the ECU 50 (step 610). The ECU 50 controls the engine operating point, which corresponds to revolutions per minute (RPM) of the internal combustion engine 64 and load/torque of the engine. NO$_x$ sensor 44 is used to sense a NO$_x$ value to assist, in combination with the engine operating point, determining the amount of diesel exhaust fluid ($\dot{m}_{DEF_{NOx}}$) to be provided to the diesel exhaust system 10 by the injectors 26, 36 shown in FIG. 1.

Upon determining the dosing amount of diesel exhaust fluid (DEF), Reference Value R is determined by the equation:

$$R = \frac{\dot{m}_{DEF_{inj1_{limit}}} + \dot{m}_{DEF_{inj2_{limit}}}}{\dot{m}_{DEF_{NOx}}}$$

as shown in FIG. 8A (step 615). The term $$(\dot{m}_{DEF_{inj1_{limit}}})$$

represents the injection rate limit for the first mixing section at the engine operating point. Finally, $$(\dot{m}_{DEF_{inj2_{limit}}})$$

represents the injection rate limit for the second mixing section at the engine operating point.

Upon a determination of Reference value R, the processor determines if the Reference value R is greater than or equal to 1 (decision step 620). When the value R is greater than or equal to "1" the program advances to operate in a standard injection mode A (step 625). In the standard mode, the amount of DEF output is split between the injectors 26, 36. The injected DEF per injector is less than the dosing limit values of the injection section so that the DEF fluid evaporates and no deposits form.

Thereafter, the processor returns (step 610) to estimate DEF dosing at the engine operating point. Thus, changes in the engine operating point and DEF dosing are accounted for in operation of the internal combustion engine 64.

In instances when the value R is less than "1" at decision step 620, the processor advances to injection mode B (step 630) shown in FIGS. 8B and 8C. The value R less than "1" indicates that additional DEF beyond the rated limits of the mixing sections must be applied to treat the exhaust in the diesel exhaust system 10. As discussed above, such additional DEF can cause the forming of solid deposits. Injection mode B operates to minimize and control the formation of solids in the diesel exhaust system 10 as follows.

In injection mode B beginning in FIG. 8B, an amount to be injected from a first injector is determined from the equation:

$$\dot{m}_{DEF_{inj1}} = frac_{inj1} \dot{m}_{DEF_{inj_{limit1}}}$$

In the equation, $frac_{inj_1}$ represents a preselected fraction that varies between 0 and 1. In the equation, $$\dot{m}_{DEF_{inj_{limit1}}}$$

represents a dosing limit for the injection rate of the first injector provided in the mixing section. The dosing limit is obtained from experimental testing of the mixing section, or calculated through analytical, empirical, semi-empirical or computational fluid dynamic modeling (step 650). In some embodiments, exhaust temperature is either measured by a temperature sensor or calculated by a temperature to assist in determining the dosing limit. Mass flow rate is calculated in some embodiments. In the equation, $\dot{m}_{DEF_{inj1}}$ represents the rate of DEF to be injected by the first injector, which is less than the injection rate for a second injector.

The program (step 650) also determines a coefficient for the first injector from the equation:

$$C_{DEF_{inj_1}} = \frac{\dot{m}_{DEF_{inj_1}}}{\dot{m}_{DEF_{NOx}}}.$$

In the equation, $C_{DEF_{inj1}}$ is the coefficient for the first injector. Finally, in FIG. 8B, the processor (step 650) determines a coefficient for the second injector from the equation:

$$C_{DEF_{inj2}} = 1 - C_{DEF_{inj1}},$$

Thus, in FIG. 8B a first coefficient for the first injector and a second coefficient for the second injector are determined (step 650).

The program then operates to apply the DEF from the first injector and the second injector in dependence upon the two coefficients times the desired amount of DEF required (step 655). The DEF applied by the second injector is greater than the dosing limit thereof.

Figure 10:
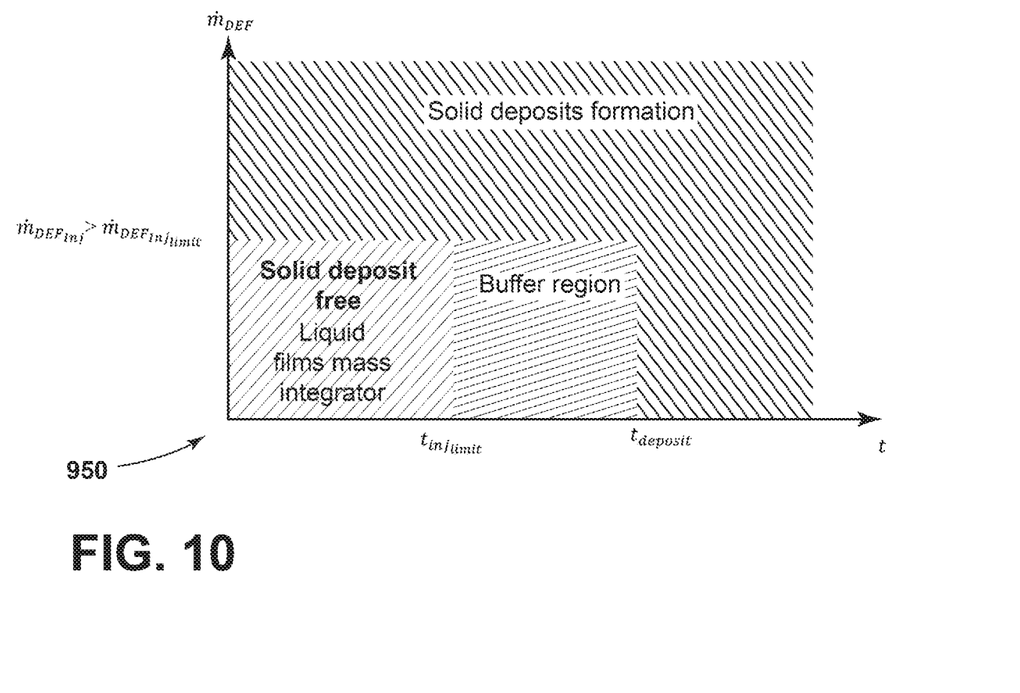
FIG. 10 is a graph showing when solid deposits being to form.

Thereafter, the program advances to compare change of time Δt with a time limit $$t_{inj_{limit_2}}$$

for the second injector (decision step 660). The time limit $t_{inj_{limit}}$ is a selected fraction time of $t_{deposit}$ ($t_{inj_{limit}} \leq t_{deposit}$). This arrangement is shown in FIG. 10 and discussed later herein.

When the equation:

$$\Delta t < t_{inj_{limit_1}}$$

is such that the change of time is less, the program returns and again executes step 650. When the change of time is not less and the selected fraction of time ends (decision step 660), the program advances to estimate developed liquid film mass (step 665).

The program shown in FIG. 8B estimates developed liquid film mass based on the following equations (step 665). For the second injector, estimated developed liquid film mass is determined from the equation:

$$m_{liquid\ film_{inj2}} = \sum \left( \dot{m}_{DEF_{inj_2}} - \dot{m}_{DEF_{inj_2 evaporate}} \right) \Delta t.$$

For the first injector, the liquid film mass is determined by the equation:

$$m_{liquid\ film_{inj1}} = \sum \left( \dot{m}_{DEF_{inj_1}} - \dot{m}_{DEF_{inj_1 evaporate}} \right) \Delta t.$$

The values $$\dot{m}_{DEF_{inj_2 evaporate}} \text{ and } \dot{m}_{DEF_{inj_1 evaporate}}$$

are evaporation rates for the DEF mass from the first and second injectors. Thus, the amount of liquid film mass for the injectors is decreased based on the evaporation rate for the DEF.

Besides determining an estimated developed liquid film mass for each injector, DEF mass is determined (step 655) in FIG. 8B from the equation:

$$m_{limit_{inj2}} = \sum \dot{m}_{DEF_{inj2_{limit}}} \Delta t, \text{ wherein } \dot{m}_{DEF_{inj2_{limit}}}$$

is dosing limit for the second injector of a mixing section. Integration over Δt, the injection time interval, provides a DEF mass limit.

The dosing limit can be obtained from experimental testing of a mixing section and stored, or can be calculated through analytical, empirical or semi-empirical modeling or computational fluid dynamic modeling.

The program shown in FIG. 8B advances to compare the estimated developed liquid film mass determined for each injector, with the parameter limit film mass for each injector (step 670). Each of the parameter limit film masses is dependent on the engine operating point. The equations are as follows:

$$m_{liquid\ film_{inj2}} < par_2 \cdot m_{limit_{inj2}},$$

and wherein $par_2$ is a selected parameter limit value for a maximum parameter limit film mass for the second injector, and $$m_{liquid\ film_{inj1}} < par_1 \cdot m_{limit_{inj1}},$$

wherein $par_1$ is a selected parameter limit value for a maximum parameter limit film mass for the first injector. The par values are selected values greater than 0.

When either of the estimated developed liquid film mass is not less than the corresponding parameter limit film mass (step 670), the program advances to perform an after treatment system (ATS) regeneration (step 675). Performing the ATS regeneration includes rapidly heating the exhaust gas to evaporate or otherwise remove deposit formation in the diesel exhaust system 10. Thus, ATS regeneration occurs if either of the estimated developed liquid film mass is greater than the corresponding parameter limit film mass. In another embodiment, ATS regeneration occurs only when both of the estimated developed liquid film mass are greater than the corresponding parameter limit film mass. The values for each estimated developed liquid film mass are reset to zero before, during, or after operation of the deposit removal (step 675).

Whether an ATS treatment occurs or not, the program continues by advancing at "C" in FIG. 8B to "C" at the top of FIG. 8C.

In FIG. 8C, an amount to be injected from a first injector is determined from the equation:

$$\dot{m}_{DEF_{inj2}} = frac_{inj_2} \dot{m}_{DEF_{inj_{limit_2}}}.$$

In the equation, $frac_{inj_2}$ represents a preselected fraction that varies between 0 and 1. In the equation, $$\dot{m}_{DEF_{inj}{_{limit_2}}}$$

represents a dosing limit for the mixing section. The dosing limit is obtained from experimental testing of the mixing section, or calculated through analytical, empirical, semi-empirical or computational fluid dynamic modeling (step 750). In the equation, $\dot{m}_{DEF_{inj2}}$ represents the amount of DEF to be injected, which is less than the amount for a second injector.

The program (step 750) also determines a coefficient for the second injector from the equation:

$$C_{DEF_{inj2}} = \frac{\dot{m}_{DEF_{inj2}}}{\dot{m}_{DEF_{NOx}}}$$

In the equation, $C_{DEF_{inj2}}$ is the coefficient for the second injector.

Finally, in FIG. 8C, the processor (step 750) determines a coefficient for the first injector from the equation: $C_{DEF_{inj1}} = 1 - C_{DEF_{inj2}}$ Thus, in FIG. 8C calculating coefficients for the first injector and the second injector is performed (step 750).

The program then operates to apply the DEF from the first injector and the second injector in dependence upon the two coefficients multiplied times the desired amount of DEF required (step 755). The DEF applied by the first injector is greater than the limit for the first injector. Further, the DEF applied by the first injector is greater than the DEF applied by the second injector.

Thereafter, the program advances to compare change of time Δt with a time limit $$t_{inj_{limit_1}}$$

for the first injector (decision step 760). The time limit $$t_{inj_{limit_1}}$$

is a selected fraction time of $t_{deposit}$ ($t_{inj_{limit}} \leq t_{deposit}$).

When the equation:

$$\Delta t < t_{inj_{limit_1}}$$

is met, the program returns and again executes step 750. When the change of time is not less (step 760), the program advances to estimate developed liquid films mass (step 765).

The program operates for estimating developed liquid film mass (step 765) based on the same equations set forth above for step 665. Thus, estimated developed liquid film mass is determined for the first and the second injectors. Further, an estimate limit DEF mass is also calculated (step 765) based on the equation $$m_{limit_{inj_1}} = \sum \dot{m}_{DEF_{inj1}{_{limit}}} \Delta t.$$

The program advances and operates for comparing whether either of the estimated developed liquid film mass is not less than the corresponding parameter limit film mass (step 770). When one of the estimated developed liquid film masses is not less, the program advances to perform an after treatment system (ATS) regeneration (step 775). The ATS regeneration heats the exhaust to evaporate or otherwise remove deposit formation in the diesel exhaust system 10. In another embodiment, both of the estimated developed liquid film masses must be greater than the corresponding parameter limit film massesto perform ATS regeneration.

Whether an ATS treatment occurs or not, the program continues by advancing to a change in operating point decision (step 780). The operating point of the engine is determined, which can be used for estimating a DEF dosing amount for each of the injectors at either steady or dynamic operation conditions of the engine. If the operating point changes during dynamic engine operating conditions (i.e., transient operating conditions), the program returns to "A" in FIG. 8A. Thereafter, injection mode A may or may not be selected. If the operating point does not change significantly, the program returns to "B" in FIG. 8B and executes the steps of recalculating an injection rate for the second injector and the first injector. The program continues operation of injection mode B, except the first injector is now outputting less DEF as compared to the second injector. The program may recalculate the injection rates for the first and second injectors repeatedly.

FIGS. 8A-8C are one example of an arrangement for controlling two or more injectors, including operating the injectors at greater than the dosing limits thereof. The steps shown can be provided in a different order. FIGS. 8B and 8C can be reversed so that injector₁ operates at a first injection rate initially, before the second injector. The first injection rate is higher than the second injection rate of the second injector. In some embodiments, the DEF flow rate is determined from the operating point. In other embodiments, sensing $NO_x$ with the $NO_x$ sensor assists to determine the desired DEF flow rate.

Figure 9:
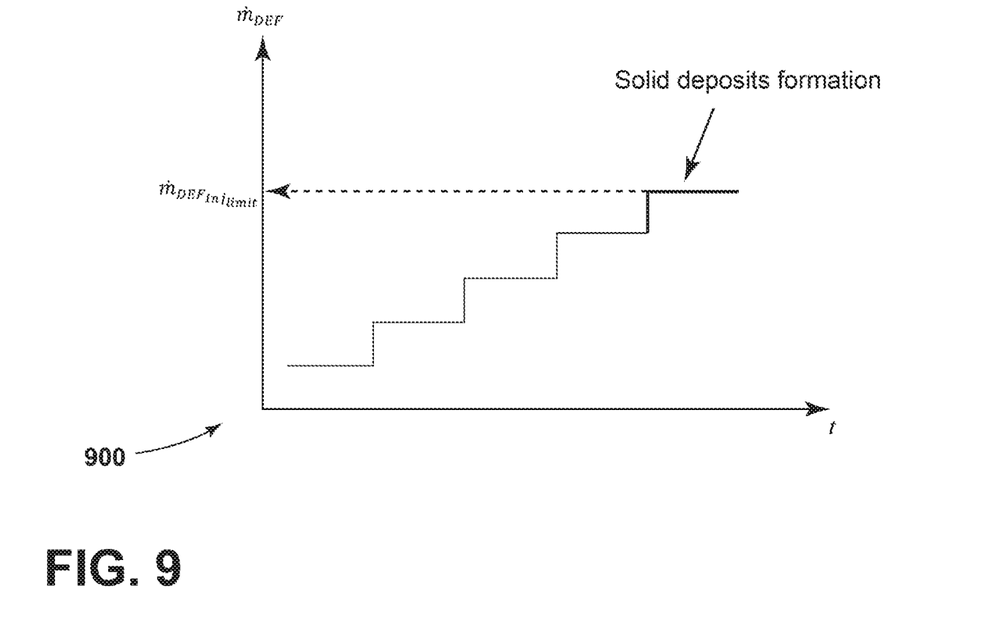
FIG. 9 is a graph of a dosing limit per mixing section over time as related to solid deposits formation occurring when the limit is met.

FIG. 9 is a graph 900 showing a limit for the injectors whereat solid deposits form over time. FIG. 10 is a graph 950 showing a solid deposit free range over time, followed by a transition time between the downward arrows wherein solid deposits start to form (buffer region) and thereafter when significant solid deposit formation occurs from the DEF injected into the diesel exhaust system.

In conclusion, in operating mode B, the DEF amount for one injector is output at a higher rate than the other injector such that deposits may form. After the injector at the higher rate of injection reaches a selected fraction of time or dosing threshold, the other injector provides DEF fluid at the higher rate. In another arrangement, only one injector operates until the dosing threshold is attained therefore. Thus, when a large quantity of DEF fluid is required, the arrangement is directed to operating both the first injector and the second injector alternatively at high dosing amounts, while operating the other injector at a lower dosing amount. Switching between the respective injectors occurs when the time threshold for the operating point of an engine is met. Further, besides switching between the injectors to provide a high DEF output when necessary, the system calculates an estimated developed liquid film mass for each injector. When the developed liquid film mass is exceeded, ATS regeneration occurs to remove solid deposits.

In the embodiment of FIG. 7, three injectors are illustrated. Thus, the equations in FIGS. 8A-8C are modified for an arrangement having three injectors. Further, in other embodiments, four or more injectors are contemplated. The calculations for the three or more injectors provide each injector exceeding a high dosing amount sequentially in one embodiment.

In another embodiment diesel exhaust system includes a processor that is configured to, when both of the estimated developed liquid film mass is not less than the corresponding parameter limit film mass, perform an ATS regeneration. Thus, ATS regeneration occurs when each estimated developed liquid film mass is greater than the corresponding parameter limit film mass for the respective injector.

Thus, the arrangement provides, among other things, a system and method for reducing and removing solid deposits formed by DEF fluid injected into a diesel exhaust system.

What is claimed is:

1. A method for controlling multiple injectors for injecting diesel exhaust fluid into a diesel exhaust system, comprising:
   determining an amount of diesel exhaust fluid to reduce $NO_x$ emissions at an engine operating point,
   determining when there is a risk of deposit formation,
   when there is a risk of deposit formation, operating one of the injectors at a first injection rate and operating another one of the injectors at a second injection rate, each for a selected fraction of time,
   estimating a developed liquid film mass for each of the injectors,
   comparing the estimated developed liquid film mass for each of the injectors with a parameter limit film mass for each of the injectors, and
   when one of the estimated developed liquid film mass is not less than the corresponding parameter limit film mass, performing an ATS regeneration to remove a deposit.

2. The method according to claim 1, wherein the selected fraction of time is dependent on the engine operating point, and wherein each of the parameter limit film masses is dependent on the engine operating point.

3. The method according to claim 1, including, when the selected fraction of time ends and each of the liquid film masses is less than the corresponding parameter limit film mass, recalculating an injection rate for each of the multiple injectors, wherein the first injection rate is now greater than the second injection rate.

4. The method according to claim 3, wherein the operating of the injectors when there is a risk of deposit formation includes calculating coefficients for each of the injectors to determine the first injection rate and the second injection rate.

5. The method according to claim 1, wherein the dosing amount of diesel exhaust fluid for each of the injectors is estimated at either steady or dynamic operating conditions of the engine.

6. The method according to claim 1, wherein sensing $NO_x$ in the diesel exhaust system with a $NO_x$ sensor is provided to determine the dosing amount of diesel exhaust fluid.

7. The method according to claim 1, wherein the multiple injectors are provided in series along the diesel exhaust system, and wherein a mixing section with or without an impingement plate is provided for each of the injectors.

8. The method according to claim 1, wherein the multiple injectors are provided in spaced, separate compact mixing sections.

9. The method according to claim 1, wherein one of the multiple injectors includes a compact mixing section, and wherein both of the estimated developed liquid film mass are not less than the corresponding parameter limit film mass to perform an ATS regeneration.

10. The method according to claim 1, wherein the multiple injectors are provided in a single compact mixing section of a compact SCR mixer.

11. The method according to claim 10, including an additional injector spaced from the compact SCR mixer.

12. A diesel exhaust system for controlling multiple injectors for injecting diesel exhaust fluid into a diesel exhaust system, comprising:
    multiple injectors,
    a dosing controller for controlling the multiple injectors, and
    a processor configured to:
       determine an amount of diesel exhaust fluid to reduce $NO_x$ emissions at an engine operating point,
       determine when there is a risk of deposit formation,
       when there is a risk of deposit formation, with the dosing controller, operating one of the injectors at a first injection rate and operating another one of the injectors at a second injection rate, each for a selected fraction of time,
       estimating a developed liquid film mass for each of the injectors, and
       comparing the estimated developed liquid film mass with a parameter limit film mass for each of the injectors.

13. The diesel exhaust system according to claim 12, wherein the processor is configured to, when one of the estimated developed liquid film mass is not less than the corresponding parameter limit film mass, perform an ATS regeneration to remove a deposit.

14. The diesel exhaust system according to claim 12, wherein the processor is configured so that the selected fraction of time is dependent on the engine operating point, and wherein each of the parameter limit film masses is dependent on the engine operating point, and wherein the processor is configured to, when both of the estimated developed liquid film mass is not less than the corresponding parameter limit film mass, perform an ATS regeneration.

15. The diesel exhaust system according to claim 12, wherein the processor is configured to: when the selected fraction of time ends and each of the liquid film masses is less than the corresponding parameter limit film mass, recalculate an injection rate for each of the injectors, wherein the first injection rate is now greater than the second injection rate.

16. The diesel exhaust system according to claim 15, wherein the operating of the injectors when there is a risk of deposit formation includes calculating coefficients for each of the injectors to determine the first injection rate and the second injection rate.

17. The diesel exhaust system according to claim 12, wherein the processor is configured to determine the dosing amount of diesel exhaust fluid for the injectors as estimated at either steady or dynamic operating conditions of the engine.

18. The diesel exhaust system according to claim 12, including a $NO_x$ sensor or a NOx model to obtain a $NO_x$ value, wherein the processor is configured to use the $NO_x$ value to determine the dosing amount of diesel exhaust fluid.

19. The diesel exhaust system according to claim 12, wherein the multiple injectors are provided in a single compact mixing section of a compact SCR mixer.

20. The diesel exhaust system according to claim 19, including an additional injector spaced from the compact SCR mixer.

\* \* \* \* \*